(12) United States Patent
Liu et al.

(10) Patent No.: US 11,490,422 B2
(45) Date of Patent: Nov. 1, 2022

(54) METHODS, TERMINAL DEVICE AND BASE STATION FOR CHANNEL SENSING IN UNLICENSED SPECTRUM

(71) Applicant: Telefonaktiebolaget LM Ericsson (publ), Stockholm (SE)

(72) Inventors: Jinhua Liu, Beijing (CN); Min Wang, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 456 days.

(21) Appl. No.: 16/482,894

(22) PCT Filed: Jul. 18, 2019

(86) PCT No.: PCT/CN2019/096600
§ 371 (c)(1),
(2) Date: Aug. 1, 2019

(87) PCT Pub. No.: WO2020/063061
PCT Pub. Date: Apr. 2, 2020

(65) Prior Publication Data
US 2021/0368544 A1    Nov. 25, 2021

(30) Foreign Application Priority Data

Sep. 26, 2018  (WO) ............... PCT/CN2018/107531

(51) Int. Cl.
*H04W 4/00* (2018.01)
*H04W 74/08* (2009.01)

(52) U.S. Cl.
CPC ... *H04W 74/0833* (2013.01); *H04W 74/0808* (2013.01)

(58) Field of Classification Search
CPC ................ H04W 74/0833; H04W 74/0808
See application file for complete search history.

(56) References Cited

U.S. PATENT DOCUMENTS

2016/0227550 A1* 8/2016 Makhlouf ............. H04L 5/0091
2016/0345360 A1 11/2016 Papaleo et al.
(Continued)

FOREIGN PATENT DOCUMENTS

CN    107040953 A    8/2017
WO    2017167303 A1   10/2017
(Continued)

OTHER PUBLICATIONS

3GPP RAN WG1 LAA Ad hoc; Paris, France; Title: [Draft] Response LS on Clarification of LBT Categories and LAA/802.11 Coexistence (R1-151192)—Mar. 24-26, 2015.
(Continued)

*Primary Examiner* — Siren Wei
(74) *Attorney, Agent, or Firm* — Christopher & Weisberg, P.A.

(57) ABSTRACT

Methods, a terminal device and a base station are disclosed for channel sensing in unlicensed spectrum. According to an embodiment, a terminal device determines to perform physical random access channel (PRACH) or physical uplink control channel (PUCCH) transmission in unlicensed spectrum. The base station determines one or more listen before talk (LBT) parameters for the PRACH or PUCCH transmission according to a purpose of the PRACH or PUCCH transmission.

20 Claims, 9 Drawing Sheets

(56) References Cited

U.S. PATENT DOCUMENTS

| | | | | |
|---|---|---|---|---|
| 2017/0353972 A1* | 12/2017 | Babaei | ................ | H04W 72/02 |
| 2019/0045529 A1* | 2/2019 | Xiong | ............... | H04W 72/0406 |
| 2019/0200386 A1* | 6/2019 | Yang | .................... | H04W 74/08 |
| 2020/0053798 A1* | 2/2020 | Tsai | .................... | H04W 74/006 |
| 2020/0359426 A1* | 11/2020 | Pan | ................... | H04W 74/0808 |
| 2021/0153245 A1* | 5/2021 | Tooher | ................ | H04W 72/046 |

FOREIGN PATENT DOCUMENTS

| | | |
|---|---|---|
| WO | 2017 194018 A1 | 11/2017 |
| WO | 2018 070087 A1 | 4/2018 |

OTHER PUBLICATIONS

PCT Notification of Transmittal of the International Search Report and the Written Opinion of the International Searching Authority, or the Declaration issued for International application No. PCT/CN2019/096600—dated Oct. 22, 2019.

EPO Communication and Supplementary European Search Report dated May 16, 2022 for European Patent Application No. EP 19865369, consisting of 9-pages.

3GPP TSG RAN WG1 Meeting #92bis R1-1805010; Title: Physical layer channel design for NR unlicensed operation: Agenda Item: 7.6.3; Source: Ericsson; Document for: Discussion and Decision: Date and Location: Apr. 16-20, 2018, Sanya, China, consisting of 5-pages.

3GPP TSG-RAN WG2 meeting #103 R2-1811663 (Revision of R2-1809788); Title: Random access procedure for NR-u: Agenda Item: 11.2.1.1; Source: Intel Corporation; Document for Discussion and Decision: Date and Location: Aug. 20-24, 2018, Gothenburg, Sweden, consisting of 3-pages.

* cited by examiner

METHODS, TERMINAL DEVICE AND BASE STATION FOR CHANNEL SENSING IN UNLICENSED SPECTRUM

PRIORITY

This nonprovisional application is a U.S. National Stage Filing under 35 U.S.C. § 371 of International Patent Application Serial No. PCT/CN2019/096600 filed Jul. 18, 2919 and entitled "METHODS, TERMINAL DEVICE AND BASE STATION FOR CHANNEL SENSING IN UNLICENSED SPECTRUM" which claims priority to International Patent Application Serial No. PCT/CN2018/107531 filed Sep. 26, 2018 both of which are hereby incorporated by reference in their entirety.

TECHNICAL FIELD

Embodiments of the disclosure generally relate to wireless communication, and, more particularly, to methods, a terminal device and a base station tor channel sensing in unlicensed spectrum.

BACKGROUND

This section introduces aspects that may facilitate better understanding of the present disclosure. Accordingly, the statements of this section are to be read in this light and are not to be understood as admissions about what is in the prior art or what is not in the prior art.

Next generation systems are expected to support a wide range of use cases with varying requirements ranging from fully mobile devices to stationary Internet of things (IoT) or fixed wireless broadband devices. The traffic patterns associated with many use cases are expected to consist of short or long bursts of data traffic with varying length of waiting period (which may be called inactive state) in between. In new radio (NR), both license assisted access (LAA) and standalone unlicensed operation are to be supported in 3rd generation partnership project (3GPP).

Listen before talk (LBT) is designed for unlicensed spectrum co-existence with other radio access technologies (RATs). In this mechanism, a radio device applies a clear channel assessment (CCA) check before any transmission. The transmitter involves energy detection (ED) over a time period compared to a certain threshold (ED threshold) in order to determine if a channel is idle. In case the channel is determined to be occupied, the transmitter performs a random back-off within a contention window before the next CCA attempt. In order to protect the acknowledgement (ACK) transmissions, the transmitter must defer a period after each busy CCA slot prior to resuming back-off. As soon as the transmitter has grasped access to a channel, the transmitter is only allowed to perform transmission up to a maximum time duration (namely, the maximum channel occupancy time simply referred to as MCOT).

In NR unlicensed spectrum (which may be simply called NR-U hereinafter), the radio resource management (RRM) procedures would be generally rather similar as in LAA, since NR-U is aiming to reuse LAA/enhanced LAA (eLAA) further enhanced LAA (feLAA) technologies as much as possible to handle the coexistence between NR-U and other legacy RATs. Channel access/selection for LAA is one of important aspects for co-existence with other RATs such as Wi-Fi. For instance, LAA has aimed to use carriers that are congested with Wi-Fi. Therefore, RRM measurements are critical for the congestion avoidance purpose.

In licensed spectrum, user equipment (UE) measures reference signal received power (RSRP) and reference signal received quality (RSRQ) of the downlink radio channel, and provides the measurement reports to its serving evolved node B (eNB) or gNB. However, they do not reflect the interference strength on the carrier. Another metric, received signal strength indicator (RSSI) can serve for such purpose. At the eNB gNB side, it is possible to derive RSSI based on the received RSRP and RSRQ reports. However, this requires that they must be available. Due to LBT failure, some reports in terms of RSRP or RSRQ may be blocked (may be either due to that the reference signal transmission is blocked in the downlink or the measurement report is blocked in the uplink). Hence, the measurements in terms of RSSI are very useful. The RSSI measurements together with the time information concerning when and how long UEs have made the measurements can assist the gNB/eNB to detect the hidden node.

Long term evolution (LTE) LAA has been defined to support measurements of averaged RSSI and channel occupancy for measurement reports. The channel occupancy is defined as a percentage of time that RSSI is measured above a configured threshold. For this purpose, a RSSI measurement timing configuration (RMTC) includes a measurement duration (e.g. 1-5 ms) and a period between measurements (e.g. {40, 80, 160, 320, 640} ms).

In NR-U, random access channel (RACH) procedures may involve four-step random access (RA) and two-step RA. The legacy four-step RA has been used in LTE and is also proposed as baseline tor NR. In thus procedure, the UE randomly selects a preamble which is transmitted. When the eNB detects the preamble, it estimates the timing alignment (TA) the UE should use in order to obtain uplink (UL) synch at the eNB. The eNB responds with the TA, a grant for Msg3. In Msg3 the UE transmits its identifier (ID), and the eNB responds by acknowledging the UE ID in Msg 4. The Msg 4 gives contention resolution. That is, only one UE's ID will be sent even if several UEs have used the same preamble (and Msg 3) simultaneously. In LTE, the four-step RA cannot be completed in less than 14 ms transmission time interval (TTI)/subframe (SF).

In the legacy four-step procedure, one of the main usage of the first two messages is to obtain UL time alignment for a UE. In many situations, e.g. in small cells or for stationary UEs, this may not be needed since either a TA value equaling zero will be sufficient (small cells) or a stored TA value from the last RA could serve also for the current RA (stationary UE). In future radio networks it can be expected that these situations are common, both due to dense deployments of small cells and a great number of e.g. stationary IoT devices. A possibility to skip the message exchange to obtain the TA value would lead to reduced RA latency and would be beneficial in several use cases, tor example when transmitting infrequent small data packets.

The two-step RA gives much shorter latency than the ordinary four-step RA. In the two-step RA, the preamble and a message corresponding to Message 3 in the four-step RA are transmitted in the same or in two subsequent subframes. The Msg3 is sent on a resource dedicated to the specific preamble. This means that both the preamble and the Msg3 face contention but contention resolution in this case means that either both preamble and Msg3 are sent without collision or both collide. Upon successful reception of the preamble and Msg 3, the eNB will respond with a TA (which by assumption should not be needed or just give very minor updates) and a Msg 4 for contention resolution. The two-step RA will consume more resources since it uses contention based transmission of the data. This means that the resources that are configured for the data may often be unused.

An issue that may occur if the UE TA is bad (e.g. using TA=0 in a large cell or using an old TA even though the UE has moved) is that only the preamble can be detected by the eNB. Because a transmission with an inaccurate TA value may interfere transmissions from other UEs in the same cell. Additionally, the preamble signal has higher detection probability than the normal data due to its design pattern. In this case the network (NW) may reply with an ordinary random access response (RAR) giving the UE an opportunity to transmit an ordinary Msg3 on a scheduled resource. This is a fallback to tour-step RA.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide improved solutions for channel sensing in unlicensed spectrum.

According to a first aspect of the disclosure, there is provided a method implemented at a terminal device. The method may comprise determining to perform physical random access channel (PRACH) or physical uplink control channel (PUCCH) transmission in unlicensed spectrum. The method may further comprise determining one or more LBT parameters for the PRACH or PUCCH transmission according to a purpose of the PRACH or PUCCH transmission.

In an embodiment of the disclosure, the purpose of the PRACH transmission may be a random access (RA) event that triggers the PRACH transmission.

In an embodiment of the disclosure, determining one or more LBT parameters for the PRACH transmission may comprise determining a priority level according to the RA event. Determining one or more LBT parameters for the PRACH transmission may further comprise determining one or more LBT parameters according to the priority level.

In an embodiment of the disclosure, the purpose of the PRACH transmission may be a service or data traffic that triggers the PRACH transmission.

In an embodiment of the disclosure, determining one or more LBT parameters for the PRACH transmission may comprise determining a priority level according to requirement(s) about transmission of the service or data traffic. Determining one or more LBT parameters for the PRACH transmission may further comprise determining one or more LBT parameters according to the priority level.

In an embodiment of the disclosure, the purpose of the PRACH or PUCCH transmission may be one of: a service that triggers the PRACH or PUCCH transmission for scheduling request (SR); a logical channel corresponding to the service; a logical channel group corresponding to the service; and an SR configuration corresponding to the service.

In an embodiment of the disclosure, determining one or more LBT parameters for the PRACH or PUCCH transmission may comprise determining a priority level according to quality of service (QoS) corresponding to the one of the service, the logical channel, the logical channel group and the SR configuration. Determining one or more LBT parameters for the PRACH or PUCCH transmission may further comprise determining one or more LBT parameters according to the priority level.

In an embodiment of the disclosure, the one or more LBT parameters may be determined based on configuration information preset in the terminal device or received from a base station.

In an embodiment of the disclosure, the priority level may be determined based on configuration information preset in the terminal device or received from a base station.

In an embodiment of the disclosure, the configuration information may be received via a radio resource control (RRC) connection reconfiguration message or a handover command.

In an embodiment of the disclosure, the configuration information may be received in a logical channel configuration RRC information element (IE) or an SR configuration RRC IE.

In an embodiment of the disclosure, the priority level may be indicated from medium access control (MAC) layer to physical layer at the terminal device.

In an embodiment of the disclosure, the one or more LBT parameters may include one or more of: a first LBT parameter indicating whether to perform LBT procedure; a second LBT parameter indicating whether to perform random back-off; a third LBT parameter indicating a fixed size of contention window; and a fourth LBT parameter indicating variable sizes of contention window.

In an embodiment of the disclosure, the one or more LBT parameters may, as a whole, indicate one of: a first LBT category in which no LBT procedure is performed; a second LBT category in which LBT procedure is performed without random back-off a third LBT category in which LBT procedure is performed with random back-off having a fixed size of contention window; and a fourth LBT category in which LBT procedure is performed with random back-off having variable sizes of contention window.

In an embodiment of the disclosure, the method may further comprise providing user data and forwarding the user data to a host computer via the transmission to the base station.

According to a second aspect of the disclosure, there is provided a method implemented at a base station. The method may comprise generating configuration information about LBT parameters which are to be used for PRACH or PUCCH transmission in unlicensed spectrum. The method may further comprise sending the configuration information to a terminal device. The configuration information may be generated based on a purpose of the PRACH or PUCCH transmission.

In an embodiment of the disclosure, the purpose of the PRACH transmission may be a RA event that triggers the PRACH transmission.

In an embodiment of the disclosure, the configuration information may at least indicate a priority level for each of multiple predetermined RA events.

In an embodiment of the disclosure, the purpose of the PRACH transmission may be a service or data traffic that triggers the PRACH transmission.

In an embodiment of the disclosure, the configuration information may at least indicate a priority level for each of multiple predetermined requirements on transmission of the service or data traffic.

In an embodiment of the disclosure, the purpose of the PRACH or PUCCH transmission may be one of: a service that triggers the PRACH or PUCCH transmission for SR; a logical channel corresponding to the service; a logical channel group corresponding to the service; and an SR configuration corresponding to the service.

In an embodiment of the disclosure, the configuration information may at least indicate a priority level for each of multiple predetermined QoS levels.

In an embodiment of the disclosure, the configuration information may be sent via a RRC connection reconfiguration message or a handover command.

In an embodiment of the disclosure, the configuration information may be sent in a logical channel configuration RRC IE or an SR configuration RRC IE.

According to a third aspect of the disclosure, there is provided a terminal device. The terminal device may comprise a processor and a memory. The memory may contain instructions executable by the processor, whereby the terminal device may be operative to determine to perform PRACH or PUCCH transmission in unlicensed spectrum. The terminal device may be further operative to determine one or more LBT parameters for the PRACH or PUCCH transmission according to a purpose of the PRACH or PUCCH transmission.

In an embodiment of the disclosure, the terminal device may be operative to perform the method according to the above first aspect.

According to a fourth aspect of the disclosure, there is provided a base station. The base station may comprise a processor and a memory. The memory may contain instructions executable by the processor, whereby the base station may be operative to generate configuration information about LBT parameters which are to be used for PRACH or PUCCH transmission in unlicensed spectrum. The base station may be further operative to send the configuration information to a terminal device. The configuration information may be generated based on a purpose of the PRACH or PUCCH transmission.

In an embodiment of the disclosure, the base station may be operative to perform the method according to the above second aspect.

According to a fifth aspect of the disclosure, there is provided a computer program product. The computer program product may comprise instructions which when executed by at least one processor, cause the at least one processor to perform the method according to any of the above first and second aspects.

According to a sixth aspect of the disclosure, there is provided a computer readable storage medium. The computer readable storage medium may comprise instructions which when executed by at least one processor, cause the at least one processor to perform the method according to any of the above first and second aspects.

According to a seventh aspect of the disclosure, there is provided a terminal device. The terminal device may comprise a first determination module for determining to perform PRACH or PUCCH transmission in unlicensed spectrum. The terminal device may further comprise a second determination module for determining one or more LBT parameters for the PRACH or PUCCH transmission according to a purpose of the PRACH or PUCCH transmission.

According to an eighth aspect of the disclosure, there is provided a base station. The base station may comprise a generation module tor generating configuration information about LBT parameters which are to be used for PRACH or PUCCH transmission in unlicensed spectrum. The base station may further comprise a sending module for sending the configuration information to a terminal device. The configuration information may be generated based on a purpose of the PRACH or PUCCH transmission.

According to a ninth aspect of the disclosure, there is provided a method implemented in a communication system including a base station and a terminal device. The method may comprise, at the base station, generating configuration information about LBT parameters which are to be used for PRACH or PUCCH transmission in unlicensed spectrum. The configuration information may be generated based on a purpose of the PRACH or PUCCH transmission. The method may further comprise, at the base station, sending the configuration information to the terminal device. The method may further comprise, at the terminal device, determining to perform PRACH or PUCCH transmission in unlicensed spectrum. The method may further comprise, at the terminal device, determining one or more LBT parameters for the PRACH or PUCCH transmission according to a purpose of the PR ACM or PUCCH transmission.

According to some embodiment(s) of the disclosure, the negative impact due to LBT failure in unlicensed spectrum can be reduced.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

Figure 1:
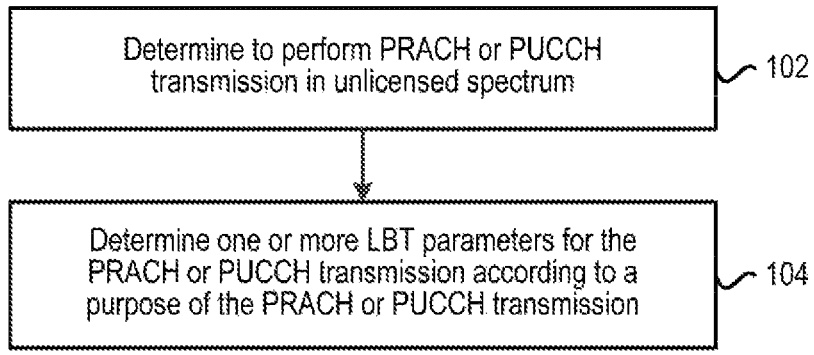
FIG. 1 is a flowchart illustrating a method implemented at a terminal device according to an embodiment of the disclosure.

For the purpose of explanation, details are set forth in the following description in order to provide a thorough understanding of the embodiments disclosed. It is apparent, however, to those skilled in the art that the embodiments may be implemented without these specific details or with an equivalent arrangement.

MuLteFire (which may be simply referred to as MF hereinafter) is an LTE-based technology that operates standalone in unlicensed spectrum. For MF, a UE shall transmit a transmission including MF-extended PUCCH (ePUCCH) on a channel on which MF transmission(s) are performed following the same channel access procedure defined for physical uplink shared channel (PUSCH) transmission. For MF cells, a UE may transmit a transmission including MF-short PUCCH (sPUCCH) on a channel. A UE may perform type 2 channel access procedure if mf-sPUCCH-Lbt is enabled by higher layer signaling. A UE may transmit without performing channel sensing if mf-sPUCCH-Lbt is not enabled by higher layer signaling. MF eNB ensures the MF-sPUCCH transmission immediately follows the preceding downlink (DL) transmission within 16 us if mf-sPUCCH-Lbt is set to be false.

For MF cells, a UE may transmit a transmission including PRACH on a channel on which MF transmission(s) are performed using type 2 channel access procedure if mf-PRACH-Lbt is set to be true by higher layer signaling. A UE may transmit a transmission including PRACH on a channel without performing channel sensing, if mf-PRACH-Lbt is set to be false by higher layer signaling. For MF cells, when mf-PRACH-Lbt is set to be true, and mf-sPUCCH-Lbt is set to be false, a UE should perform a type 2 channel access procedure on subframe n which is configured by higher layer signaling for PRACH transmission.

In LTE LAA/eLAA/feLAA, there is no standalone unlicensed spectrum scenario meaning that the UE does not need to support RACH and PUCCH-SR transmissions in the unlicensed spectrum cells as secondary cells, since they can basically be transmitted over the licensed spectrum cells as primary cells.

However, in RAN1 #92, agreements have been reached tor the Study on NR-based access to unlicensed Spectrum. Specifically, the additional functionality needed beyond the specifications for operation in licensed spectrum will be studied in the following deployment scenarios: 1) carrier aggregation between licensed band NR (PCell) and NR-U (SCell), where NR-U SCell may have both DL and UL, or DL-only; 2) dual connectivity between licensed band LTE (PCell) and NR-U (PSCell); 3) Stand-alone NR-U; 4) an NR cell with DL in unlicensed band and UL in licensed band; 5) dual connectivity between licensed band NR (PCell) and NR-U (PSCell). In this new study item. NR unlicensed operation needs to support both standalone and dual connectivity (DC) scenarios. This means that both RACH and PUCCH-SR signaling need to be transmitted over unlicensed spectrum cells, since an NR-U cell may operate as a primary cell.

LAA has defined a channel access priority class (CAPC) for every PUSCH transmission in case Type 1 channel access is chosen. For a transmission of a sounding reference signal (SRS) without a PUSCH from a UE, the UE shall always utilize type 1 uplink channel access procedure with the highest priority class.

In order to implement the support for RACH and PUCCH-SR signaling in NR-U cell, one of the key aspects is how to support the channel access to the unlicensed channel for them, which are shared by NR-U UEs and other RATs. As described above, in a MF cell, a UE supports either no LBT or LBT for both PRACH and PUCCH transmissions. Purely reusing these existing rules in MF for NR-U is not sufficient, since in the existing RAT technologies such as MF, the PUCCH-SR and PRACH signaling does not support differentiation between prioritized signaling and non-prioritized signaling depending on service types or RA events. However, NR-U as a new RAT for unlicensed spectrum is aiming to use existing NR RAT technology as the baseline, and introduce the support for unlicensed spectrum operations. In the existing NR licensed cells, a UE can be configured with service specific SR configuration. A UE with multiple services can be configured with multiple PUCCH-SR configurations. PRACH signaling has similar mechanism between PRACH transmissions for different purposes. PRACH accesses in NR can be categorized as prioritized access and non-prioritized access. For the prioritized ones, the UE can skip or perform backoff in short interval to reduce the RACH delay. The UE can perform faster power ramp for prioritized ones.

Therefore, it would be advantageous to study the following issues in order to design channel access for RACH and PUCCH-SR. Firstly, RACH procedures can be triggered for many different events. In NR, those events are classified into prioritized and non-prioritized. Shall NR-U also distinguish those RACH events between each other, and give different channel access priority levels? If so, how to define LBT schemes for each different RACH event?

Secondly, in NR licensed cell, Rel-15 has introduced the support of service specific PUCCH-SR configuration. Thus, it would be beneficial to distinguish PUCCH-SR signaling between different services/SR configurations. How to define LBT schemes for different PUCCH-SRs that are triggered by different services?

The present disclosure proposes improved solutions for channel sensing in unlicensed spectrum. These solutions may be applied to a wireless communication system including a terminal device and a base station. The terminal device can communicate through a radio access communication link with the base station. The base station can provide radio access communication links to terminal devices that are within its communication service cell. The base station may be, for example, an eNB or a gNB. Note that the communications may be performed between the terminal device and the base station according to any suitable communication standards and protocols. The terminal device may also be referred to as, for example, access terminal, user equipment (UE), mobile station, mobile unit, subscriber station, or the like. It may refer to any end device that can access a wireless communication network and receive services therefrom. By way of example and not limitation, the terminal device may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a terminal device may represent a machine or other device that performs monitoring and or measurements, and transmits the results of such monitoring and/or measurements to another terminal device and or a network equipment. In this case, the terminal device may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

Now, several embodiments will be described to explain the solutions which may be used for achieving configurable LBT schemes and parameters for PRACH and PUCCH transmissions. As an exemplary example, the configurable LBT schemes comprise at least one of the below four LBT categories (which may also be referred to as Type 1 or Type 2 channel access in 3GPP specification, e.g., TS 36.213-f00). Category 1 means No LBT. Category 2 means LBT without random back-off. Category 3 means LBT with random back-off with fixed size of contention window. Category 4 means LBT with random back-off with variable size of contention window. Although these embodiments will be described in the context of NR unlicensed spectrum (NR-U), those skilled in the art can understand that the same principle is also applicable to other unlicensed operation scenarios such as LTE LAA/eLAA.

In general, an LBT scheme and or a set of LBT parameters may be determined based on the purpose of a PRACH or PUCCH transmission. As a first embodiment, the network may configure a specific LBT scheme and or a set of LBT (or channel access) parameters according to the RA event that triggers a PRACH transmission. In this case, the purpose of the PRACH transmission is represented by the RA event. For example, some PRACH transmissions may be prioritized by configuring LBT scheme with short LBT intervals, or no LBT.

Various RA events (or triggers) have been defined in NR. These RA events may include: initial access from RRC IDLE; RRC Connection Re-establishment procedure; handover; DL or UL data arrival during RRC_CONNECTED when UL synchronization status is "non-synchronized"; transition from RRC_INACTIVE; to establish time alignment at SCell addition; request for other system information (SI); and beam failure recovery.

For the above RA events, a priority level may be defined to be associated with each different RA event. Such priority level may be reconfigurable by the network. In this way, the priority level of each RA event may be mapped to a specific LBT scheme and or a set of channel access parameters.

As the first example, NR has been defined to support prioritized RA access for handover and beam failure recovery (BFR) in Rel-15. Therefore, these prioritized RA access may be given with LBT scheme for delay sensitive transmissions, such as no LBT, or short LBT. The non-prioritized RA access may use LBT schemes intended for delay insensitive transmissions, such as one of the priorities in Type 1 channel access.

As the second example, different LBT scheme and or set of LBT parameters may be configured tor different RA event transmission. For instance, PRACH transmission of highest priority (corresponding to e.g. beam failure recovery upon beam failure, or handover, or RACH-SR) may be configured to be performed without LBT. PRACH transmission of medium priority (corresponding to e.g. radio connection reestablishment upon radio link failure) may be configured with short LBT (e.g. Type 2 LBT). In this way, radio connection maintenance in unlicensed spectrum can be increased. PRACH transmission of delay insensitive case (corresponding to e.g. initial access from RRC IDLE) may be configured with Type 1 LBT with priority 1. Note that the above examples are merely for illustration purpose but not for limitation purpose.

As a second embodiment, an LBT scheme and/or a set of LBT parameters may be configured according to what service data type triggers the PRACH transmission. In this case, the purpose of the PRACH transmission is represented by the service/data type. For example, for a service with low latency requirement, an LBT scheme with shorter LBT interval may be configured. In this way, the performance of RA can be optimized with optimized latency management. Alternatively, any other requirement may be used instead, such as packet loss requirement, transmission reliability requirement, or the like.

As a third embodiment, differentiated LBT schemes and or parameters may be configured for SR transmissions for different services according to the corresponding QoS requirements. In this case, the purpose of the PRACH or PUCCH transmission is represented by the service. As an example, an LBT scheme with no or short LBT (e.g. Type 2 LBT scheme) may be configured for RACH-SR transmission triggered by ultra reliable & low latency communication (URLLC) service, while an LBT scheme with longer LBT (e.g. Type 1 LBT scheme) may be configured for RACH-SR triggered by enhanced mobile broadband (eMBB) service. Similarly, an LBT scheme with no or short LBT may be configured for PUCCH SR transmission triggered by URLLC service, while LBT scheme with longer LBT (e.g. Type 1 LBT scheme) may be configured for PUCCH SR triggered by eMBB service. In this way, the negative impact due to LBT failure on UL data transfer and UL RACH performance can be eliminated. As another example, SR configuration/logical channel (LCH) logical channel group (LCG) specific LBT scheme may be applied.

As a fourth embodiment, an LBT scheme or a set of channel access parameters may be configured in a logical channel configuration RRC information element (IE). As a fifth embodiment, an LBT scheme or a set of channel access parameters may be configured in an SR configuration RRC IE.

As a sixth embodiment, an LBT scheme or a set of channel access parameters may be carried by a handover command. Upon reception of the handover command, the UE may perform LBT for PRACH transmission based on the configured LBT scheme and/or configured channel access parameters.

As a seventh embodiment, the MAC layer of a UE may indicate the priority level of a triggered RACH or PUCCH-SR transmission to the lower layer. The lower layer may trigger LBT based on the knowledge of the received priority information accordingly.

Hereinafter, the solutions will be further described with reference to FIGS. 1-8. FIG. 1 is a flowchart illustrating a method implemented at a terminal device according to an embodiment of the disclosure. At block 102, the terminal device determines to perform PRACH or PUCCH transmission in unlicensed spectrum. For the PRACH transmission, the determination may be performed in response to a RA event, which has been described above with respect to the first embodiment. For the PUCCH transmission, the determination may be performed in response to a trigger event indicating that an SR is needed to be sent. At block 104, the terminal device determines one or more LBT parameters for the PRACH or PUCCH transmission according to a purpose of the PRACH or PUCCH transmission. As an exemplary example, the one or more LBT parameters may include one or more of: a first LBT parameter indicating whether to perform LBT procedure, a second LBT parameter indicating whether to perform random back-off, a third LBT parameter indicating a fixed size of contention window, and a fourth LBT parameter indicating variable sizes of contention window. The one or more LBT parameters, as a whole, may indicate one of: a first LBT category in which no LBT procedure is performed, a second LBT category in which LBT procedure is performed without random back-off a third LBT category in which LBT procedure is performed with random back-off having a fixed size of contention window, and a fourth LBT category in which LBT procedure is performed with random back-off having variable sizes of contention window.

Figure 2:
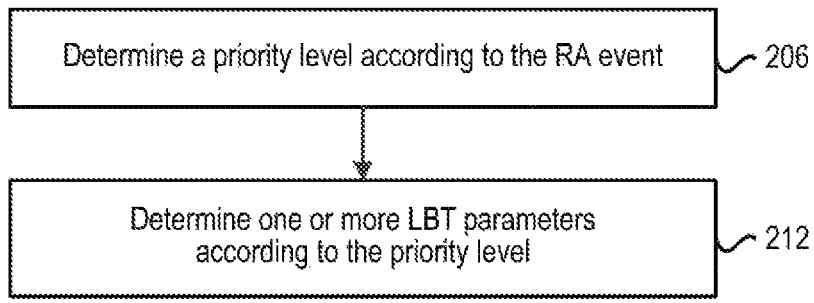
FIG. 2 is a flowchart for explaining the method of FIG. 1.

As a first option, block 104 may be implemented as blocks 206 and 212 of FIG. 2. In this case, the purpose of the PRACH transmission is a RA event that triggers the PRACH transmission. At block 206, a priority level is determined according to the RA event. This determination may be performed based on configuration information which indicates a priority level for each of multiple predetermined RA events. The configuration information may be preset in the terminal device or received from a base station. In the latter case, the configuration information may be received via a RRC connection reconfiguration message or a handover command in a logical channel configuration RRC IE or an SR configuration RRC IE. Note that the present disclosure is not limited to this example and any other suitable message or IE may be used instead. The examples for the correspondence between the priority level and the RA event have been described above with respect to the first embodiment.

At block 212, one or more LBT parameters are determined according to the priority level. Similar to block 206, the determination at block 212 may be performed based on configuration information which indicates corresponding LBT parameters) for each of multiple predetermined priority levels. The configuration information may be preset in the terminal device or received from a base station. For example, the priority level may be indicated from MAC layer to the physical layer such that the one or more LBT parameters can be determined by the physical layer.

Figure 3:
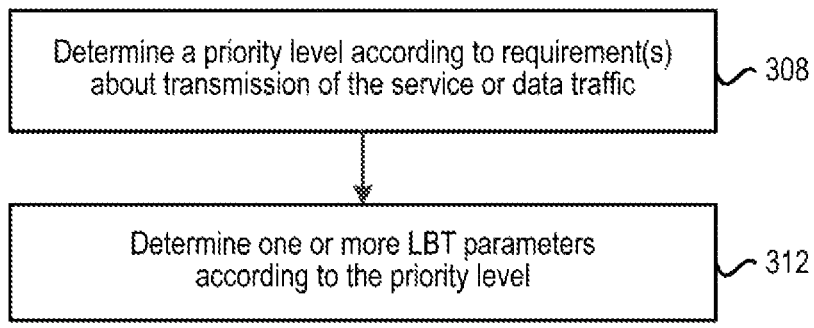
FIG. 3 is a flowchart for explaining the method of FIG. 1.

As the second option, block 104 may be implemented as blocks 308 and 312 of FIG. 3. In this case, the purpose of the PRACH transmission is a service or data traffic that triggers the PRACH transmission. At block 308, a priority level is determined according to requirements) about transmission of the service or data traffic. For example, the requirement may be one or more of: latency requirement, packet loss requirement, transmission reliability requirement, or the like. Similar to block 206, the determination at block 308 may be performed based on configuration information which indicates a priority level tor each of multiple predetermined requirements about transmission of the service or data traffic. The examples for the correspondence between the priority level and the requirement(s) have been described above with respect to the second embodiment. At block 312, one or more LBT parameters are determined according to the priority level. Block 312 may be the same as block 212 and its details are omitted here.

Figure 4:
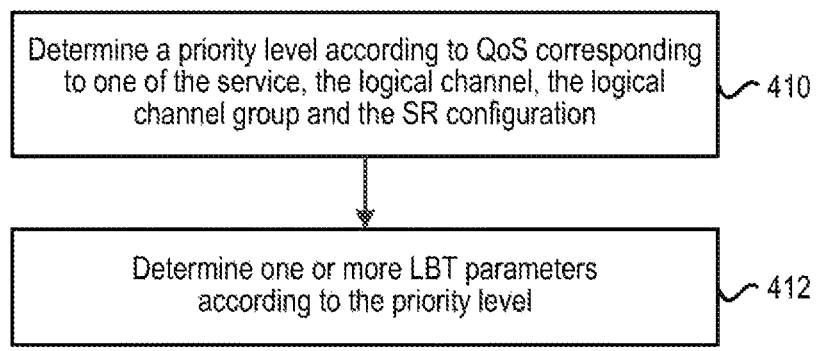
FIG. 4 is a flowchart for explaining the method of FIG. 1.

As a third option, block 104 may be implemented as blocks 410 and 412 of FIG. 4. In this case, the purpose of the PRACH or PUCCH transmission is one of: a service that triggers the PRACH or PUCCH transmission for SR; a logical channel corresponding to the service; a logical channel group corresponding to the service; and an SR configuration corresponding to the service. At block 410, a priority level is determined according to QoS corresponding to the one of the service, the logical channel, the logical channel group and the SR configuration. Similar to block 206, the determination at block 410 may be performed based on configuration information which indicates a priority level for each of multiple predetermined QoS levels. The examples tor the correspondence between the priority level and the QoS level have been described above with respect to the third embodiment. At block 412, one or more LBT parameters are determined according to the priority level. Block 412 may be the same as block 212 and its details are omitted here.

Figure 5:
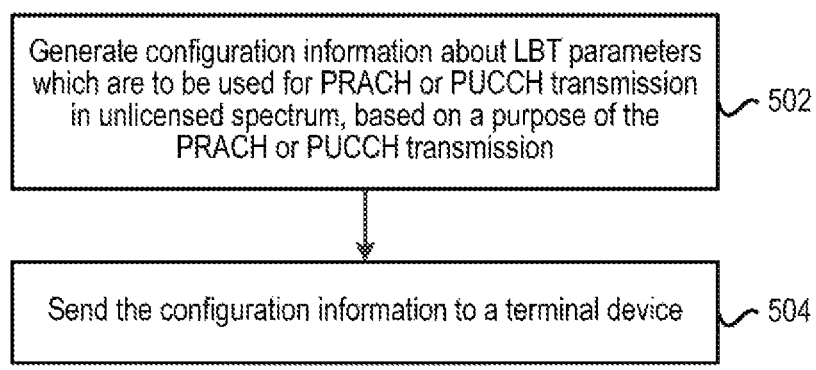
FIG. 5 is a flowchart illustrating a method implemented at a base station according to an embodiment of the disclosure.

FIG. 5 is a flowchart illustrating a method implemented at a base station according to an embodiment of the disclosure. At block 502, configuration information about LBT parameters which are to be used for PRACH or PUCCH transmission in unlicensed spectrum is generated based on a purpose of the PRACH or PUCCH transmission. As described above, in the above first option, the configuration information may at least indicate a priority level for each of multiple predetermined RA events. In the above second option, the configuration information may at least indicate a priority level for each of multiple predetermined requirements on transmission of the service or data traffic. In the above third option, the configuration information may at least indicate a priority level for each of multiple predetermined QoS levels (or requirements). Optionally, the configuration information may further indicate corresponding LBT parameters) for each of multiple predetermined priority levels. At block 504, the base station sends the configuration information to a terminal device. For example, the configuration information may be sent via a RRC connection reconfiguration message or a handover command in a logical channel configuration RRC IE or an SR configuration RRC IE. It should be noted that two blocks shown in succession in the figures may, in fact, be executed substantially concurrently, or the blocks may sometimes be executed in the reverse order, depending upon the functionality involved.

Based on the above description, at least one aspect of the present disclosure provides a method implemented in a communication system including a base station and a terminal device. The method may comprise, at the base station, generating configuration information about LBT parameters which are to be used for PRACH or PUCCH transmission in unlicensed spectrum. The configuration information may be generated based on a purpose of the PRACH or PUCCH transmission. The method may further comprise, at the base station, sending the configuration information to the terminal device. The method may further comprise, at the terminal device, determining to perform PRACH or PUCCH transmission in unlicensed spectrum. The method may further comprise, at the terminal device, determining one or more LBT parameters for the PRACH or PUCCH transmission according to a purpose of the PRACH or PUCCH transmission.

Figure 6:
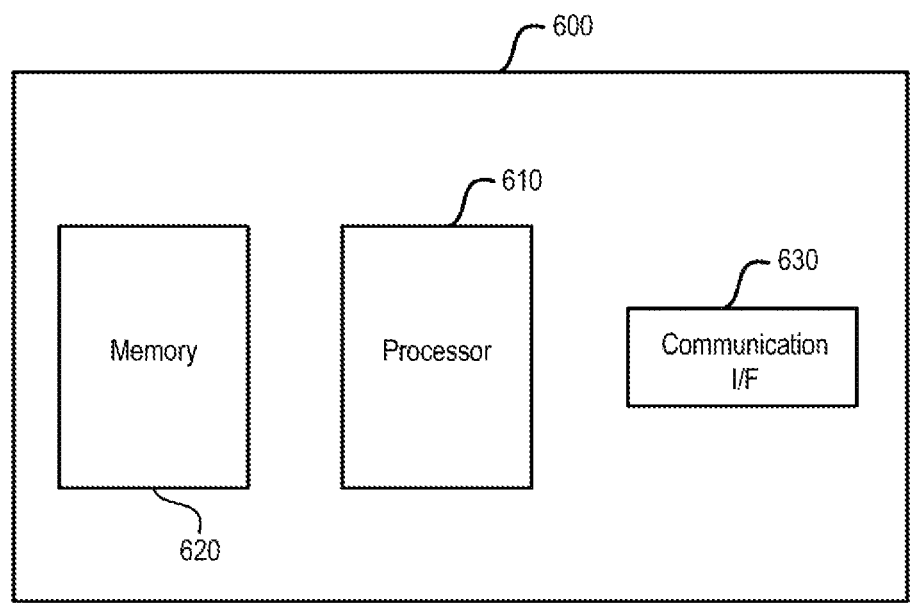
FIG. 6 is a block diagram showing an apparatus suitable for use in practicing some embodiments of the disclosure.

FIG. 6 is a block diagram showing an apparatus suitable for use in practicing some embodiments of the disclosure. For example, any one of the terminal device and the base station described above may be implemented through the apparatus 600. As shown, the apparatus 600 may include a processor 610, a memory 620 that stores a program, and a communication interface 630 for communicating data with other external devices through wired and/or wireless communication.

The program includes program instructions that, when executed by the processor 610, enable the apparatus 600 to operate in accordance with the embodiments of the present disclosure, as discussed above. That is, the embodiments of the present disclosure may be implemented at least in part by computer software executable by the processor 610, or by hardware, or by a combination of software and hardware.

The memory 620 may be of any type suitable to the local technical environment and may be implemented using any suitable data storage technology, such as semiconductor based memory devices, flash memories, magnetic memory devices and systems, optical memory devices and systems, fixed memories and removable memories. The processor 610 may be of any type suitable to the local technical environment, and may include one or more of general purpose computers, special purpose computers, microprocessors, digital signal processors (DSPs) and processors based on multi-core processor architectures, as non-limiting examples.

Figure 7:
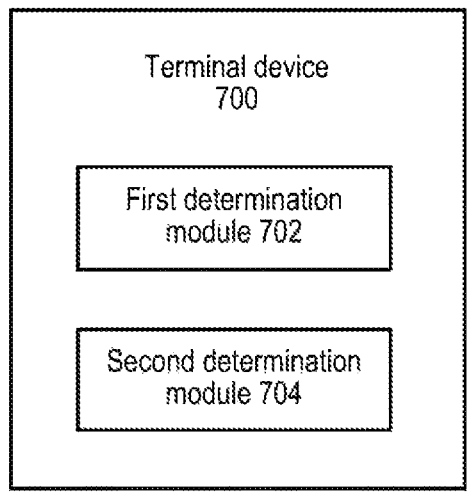
FIG. 7 is a block diagram showing a terminal device according to an embodiment of the disclosure.

FIG. 7 is a block diagram showing a terminal device according to an embodiment of the disclosure. As shown, the terminal device 700 comprises a first determination module 702 and a second determination module 704. The first determination module 702 may be configured to determine to perform PRACH or PUCCH transmission in unlicensed spectrum, as described above with respect to block 102. The second determination module 704 may be configured to determine one or more LBT parameters for the PRACH or PUCCH transmission according to a purpose of the PRACH or PUCCH transmission, as described above with respect to block 104.

Figure 8:
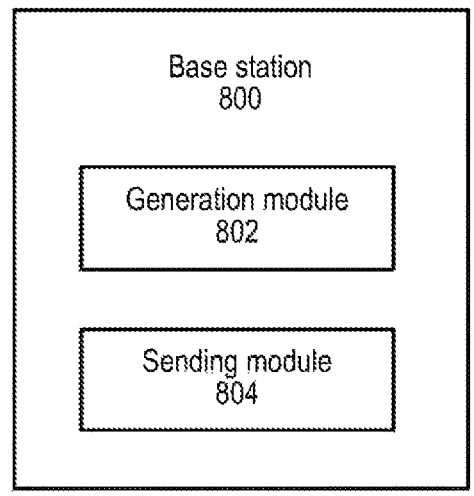
FIG. 8 is a block diagram showing a base station according to an embodiment of the disclosure.

FIG. 8 is u block diagram showing a base station according to an embodiment of the disclosure. As shown, the base station 800 comprises a generation module 802 and a sending module 804. The generation module 802 may be configured to generate configuration information about LBT parameters which are to be used for PRACH or PUCCH transmission in unlicensed spectrum, based on a purpose of the PRACH or PUCCH transmission, as described above with respect to block 502. The sending module 804 may be configured to send the configuration information to a terminal device, as described above with respect to block 504. The modules described above may be implemented by hardware, or software, or a combination of both.

Figure 9:
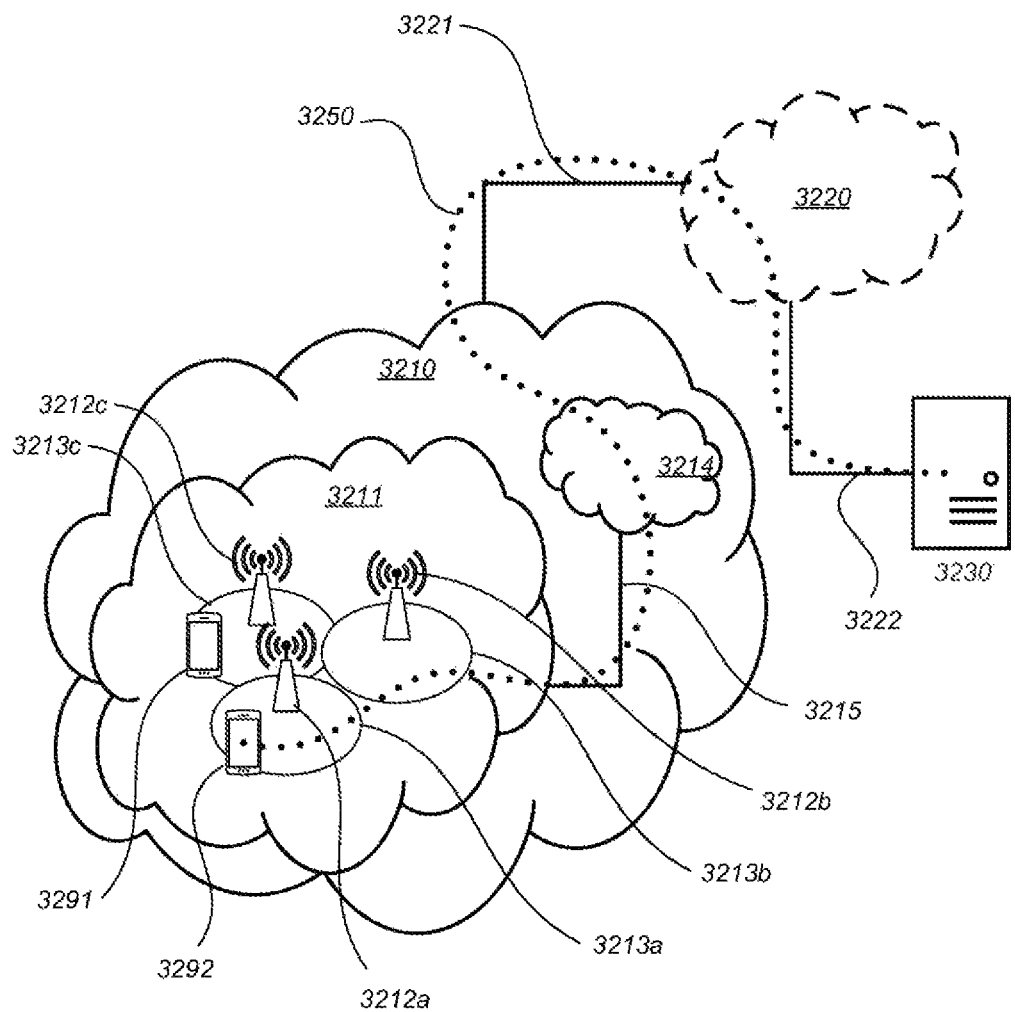
FIG. 9 is a diagram showing a telecommunication network connected via an intermediate network to a host computer in accordance with some embodiments.

With reference to FIG. 9, in accordance with an embodiment, a communication system includes telecommunication network 3210, such as a 3GPP-type cellular network, which comprises access network 3211, such as a radio access network, and core network 3214. Access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to core network 3214 over a wired or wireless connection 3215. A first LTE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a sendee provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 9 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 10. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 farther includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 10) served by base station 3320. Communication interface 3326 may be configured to facilitate connection 3360 to host computer 3310. Connection 3360 may be direct or it may pass through a core network (not shown in FIG. 10) of the telecommunication system anchor through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. Its hardware 3335 may include radio interface 3337 configured to set up and maintain wireless connection 3370 with a base station serving a coverage area in which UE 3330 is currently located. Hardware 3335 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the sendee to the user, client application 3332 may receive request data from host application 3312 and provide user data in response to the request data. OTT connection 3350 may transfer both the request data and the user data. Client application 3332 may interact with the user to generate the user data that it provides.

Figure 10:
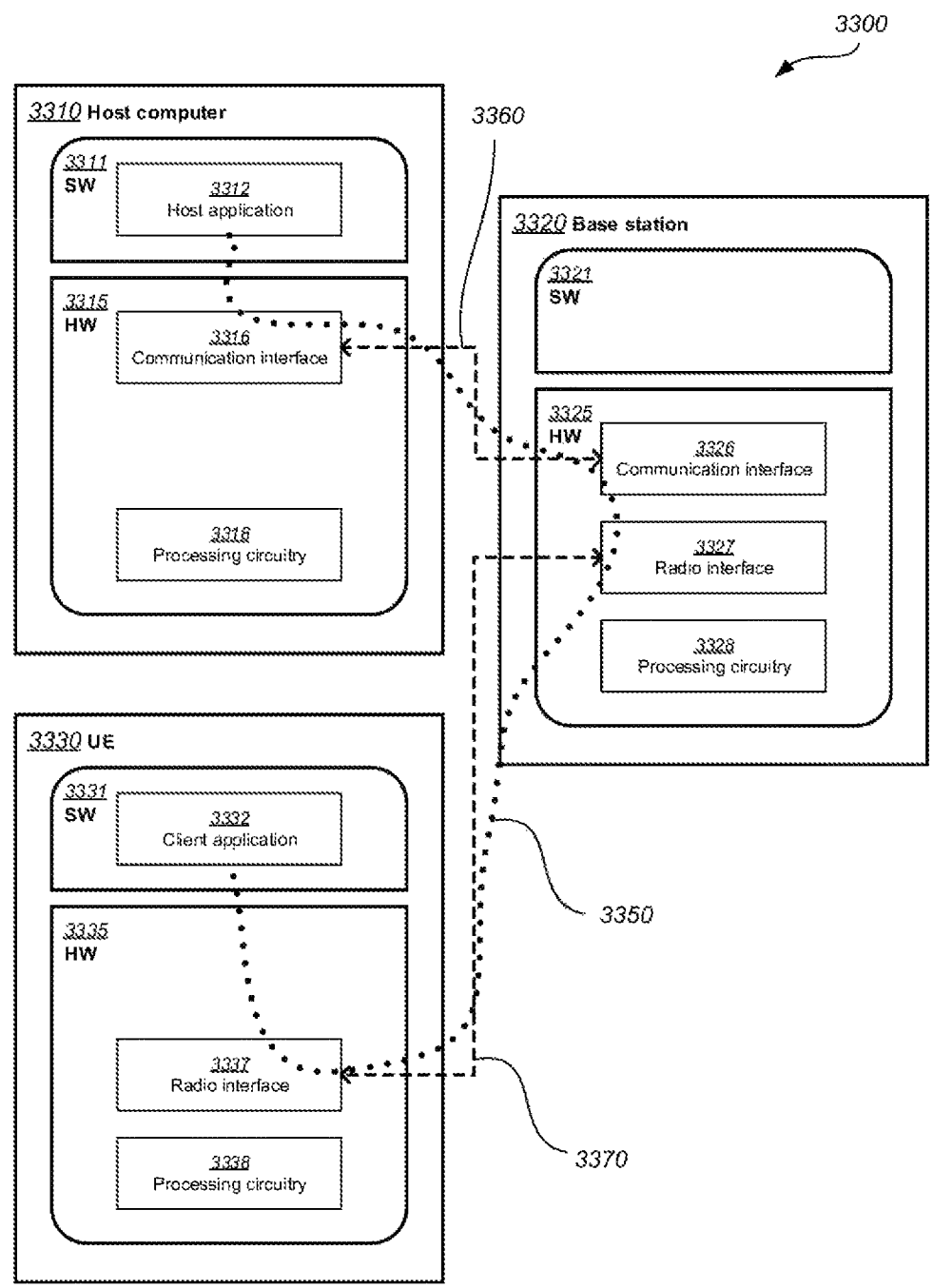
FIG. 10 is a diagram showing a host computer communicating via a base station with a user equipment in accordance with some embodiments.

It is noted that host computer 3310, base station 3320 and UE 3330 illustrated in FIG. 10 may be similar or identical to host computer 3230, one of base stations 3212*a*, 3212*b*, 3212*c* and one of UEs 3291, 3292 of FIG. 9, respectively. This is to say, the inner workings of these entities may be as shown in FIG. 10 and independently, the surrounding network topology may be that of FIG. 9.

In FIG. 10, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the latency and thereby provide benefits such as reduced user waiting time.

A measurement procedure may be provided tor the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3335 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figure 11:
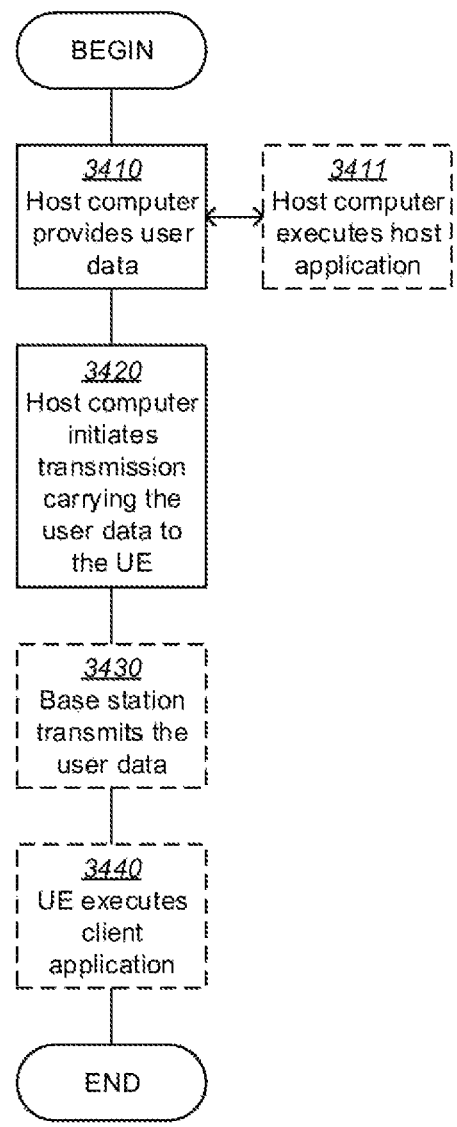
FIG. 11 is a flowchart illustrating a method implemented in a communication system in accordance with some embodiments.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

Figure 12:
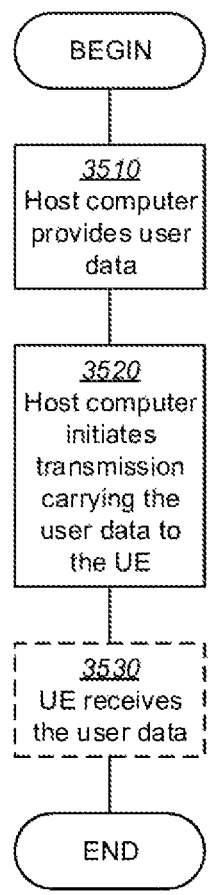
FIG. 12 is a flowchart illustrating a method implemented in a communication system in accordance with some embodiments.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

Figure 13:
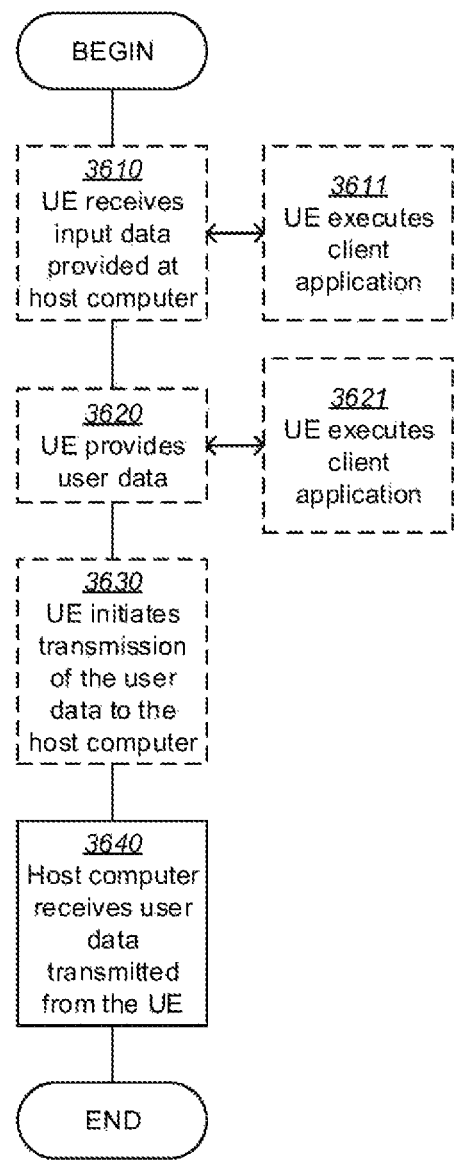
FIG. 13 is a flowchart illustrating a method implemented in a communication system in accordance with some embodiments.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

Figure 14:
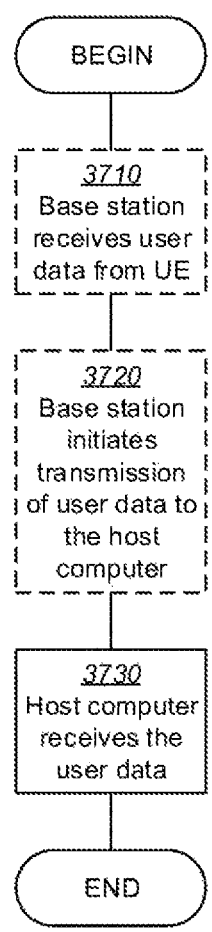
FIG. 14 is a flowchart illustrating a method implemented in a communication system in accordance with some embodiments.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

According to an aspect of the disclosure, there is provided a method implemented in a communication system including a host computer, a base station and a terminal device. The method may comprise, at the host computer, receiving user data transmitted to the base station from the terminal device. The terminal device may determine to perform PRACH or PUCCH transmission in unlicensed spectrum. The terminal device may determine one or more LBT parameters for the PRACH or PUCCH transmission according to a purpose of the PRACH or PUCCH transmission.

In an embodiment of the disclosure, the method may further comprise, at the terminal device, providing the user data to the base station.

In an embodiment of the disclosure, the method may further comprise, at the terminal device, executing a client application, thereby providing the user data to be transmitted. The method may further comprise, at the host computer, executing a host application associated with the client application.

In an embodiment of the disclosure, the method may further comprise, at the terminal device, executing a client application. The method may further comprise, at the terminal device, receiving input data to the client application. The input data may be provided at the host computer by executing a host application associated with the client application. The user data to be transmitted may be provided by the client application in response to the input data.

According to another aspect of the disclosure, there is provided a communication system including a host computer comprising a communication interface configured to receive user data originating from a transmission from a terminal device to a base station. The terminal device may comprise a radio interface and processing circuitry. The processing circuitry of the terminal device may be configured to determine to perform PRACH or PUCCH transmission in unlicensed spectrum. The processing circuitry of the terminal device may be further configured to determine one or more LBT parameters for the PRACH or PUCCH transmission according to a purpose of the PRACH or PUCCH transmission.

In an embodiment of the disclosure, the communication system may further include the terminal device.

In an embodiment of the disclosure, the communication system may further include the base station. The base station may comprise a radio interface configured to communicate with the terminal device and a communication interface configured to forward to the host computer the user data carried by a transmission from the terminal device to the base station.

In an embodiment of the disclosure, the processing circuitry of the host computer may be configured to execute a host application. The processing circuitry of the terminal device may be configured to execute a client application associated with the host application, thereby providing the user data.

In an embodiment of the disclosure, the processing circuitry of the host computer may be configured to execute a host application, thereby providing request data. The processing circuitry of the terminal device may be configured to execute a client application associated with the host application, thereby providing the user data in response to the request data.

According to another aspect of the disclosure, there is provided a method implemented in a communication system including a host computer, a base station and a terminal device. The method may comprise, at the host computer, providing user data. The method may further comprise, at the host computer, initiating a transmission carrying the user data to the terminal device via a cellular network comprising the base station. The base station may generate configuration information about LBT parameters which are to be used for PRACH or PUCCH transmission in unlicensed spectrum. The base station may send the configuration information to a terminal device. The configuration information may be generated based on a purpose of the PRACH or PUCCH transmission.

In an embodiment of the disclosure, the method may further comprise, at the base station, transmitting the user data.

In an embodiment of the disclosure, the user data may be provided at the host computer by executing a host application. The method may further comprise, at the terminal device, executing a client application associated with the host application.

According to another aspect of the disclosure, there is provided a communication system including a host computer comprising processing circuitry configured to provide user data and a communication interface configured to forward the user data to a cellular network for transmission to a terminal device. The cellular network may comprise a base station having a radio interface and processing circuitry. The base station's processing circuitry may be configured to generate configuration information about LBT parameters which are to be used for PRACH or PUCCH transmission in unlicensed spectrum. The base station's processing circuitry may be further configured to send the configuration information to a terminal device. The configuration information may be generated based on a purpose of the PRACH or PUCCH transmission.

In an embodiment of the disclosure, the communication system may further include the base station.

In an embodiment of the disclosure, the communication system may further include the terminal device. The terminal device may be configured to communicate with the base station.

In an embodiment of the disclosure, the processing circuitry of the host computer may be configured to execute a host application, thereby providing the user data. The terminal device may comprise processing circuitry configured to execute a client application associated with the host application.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure Is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with ail embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and or "including", when used herein, specify the presence of stated features, elements, and/or components, but do not preclude the presence or addition of one or more other features, elements, components and or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method implemented at a terminal device, the method comprising:
    determining to perform physical random access channel, PRACH, or physical uplink control channel, PUCCH, transmission in unlicensed spectrum;
    determining one or more listen before talk, LBT, parameters for the PRACH or PUCCH transmission according to a purpose of the PRACH or PUCCH transmission;
    configuring differentiated LBT schemes and differentiated parameters for scheduling request (SR) transmissions based on the purpose, and based on at least one QoS requirement corresponding to the purpose, at least a first differentiated LBT scheme being configured for a first purpose corresponding to a first service and a second differentiated LBT scheme being configured for a second purpose corresponding to a second service; and
    transmitting in the unlicensed spectrum using the differentiated LBT schemes.

2. The method according to claim 1, wherein the purpose of the PRACH transmission is a random access, RA, event that triggers the PRACH transmission.

3. The method according to claim 2, wherein determining one or more LBT parameters for the PRACH transmission comprises:
    determining a priority level according to the RA event; and
    determining one or more LBT parameters according to the priority level.

4. The method according to claim 1, wherein the purpose of the PRACH transmission is a service or data traffic that triggers the PRACH transmission.

5. The method according to claim 4, wherein determining one or more LBT parameters for the PRACH transmission comprises:
    determining a priority level according to requirement(s) about transmission of the service or data traffic; and
    determining one or more LBT parameters according to the priority level.

6. The method according to claim 1, wherein the purpose of the PRACH or PUCCH transmission is one of:
    a service that triggers the PRACH or PUCCH transmission for scheduling request, SR;
    a logical channel corresponding to the service;
    a logical channel group corresponding to the service; and
    an SR configuration corresponding to the service.

7. The method according to claim 6, wherein determining one or more LBT parameters for the PRACH or PUCCH transmission comprises:

determining a priority level according to quality of service (QoS) corresponding to the one of the service, the logical channel, the logical channel group and the SR configuration; and determining one or more LBT parameters according to the priority level.

8. The method according to claim 1, wherein the one or more LBT parameters are determined based on configuration information preset in the terminal device or received from a base station.

9. The method according to claim 3, wherein the priority level is determined based on configuration information preset in the terminal device or received from a base station.

10. The method according to claim 8, wherein the configuration information is received via a radio resource control, RRC, connection reconfiguration message or a handover command.

11. The method according to claim 10, wherein the configuration information is received in a logical channel configuration RRC information element, IE, or an SR configuration RRC IE.

12. The method according to claim 3, wherein the priority level is indicated from medium access control, MAC, layer to physical layer at the terminal device.

13. The method according to claim 1, wherein the one or more LBT parameters include one or more of:
   a first LBT parameter indicating whether to perform LBT procedure;
   a second LBT parameter indicating whether to perform random back-off;
   a third LBT parameter indicating a fixed size of contention window; and
   a fourth LBT parameter indicating variable sizes of contention window.

14. The method according to claim 13, wherein the one or more LBT parameters, as a whole, indicate one of:
   a first LBT category in which no LBT procedure is performed;
   a second LBT category in which LBT procedure is performed without random back-off;
   a third LBT category in which LBT procedure is performed with random back-off having a fixed size of contention window; and
   a fourth LBT category in which LBT procedure is performed with random back-off having variable sizes of contention window.

15. A method implemented at a base station, the method comprising:
   generating configuration information about listen before talk, LBT, parameters which are to be used for physical random access channel, PRACH, or physical uplink control channel, PUCCH, transmission in unlicensed spectrum;
   sending the configuration information to a terminal device;
   the configuration information being generated based on a purpose of the PRACH or PUCCH transmission, and differentiated LBT schemes and differentiated parameters for scheduling request (SR) transmissions being configured based on the purpose, and based on at least one QoS requirement corresponding to the purpose, at least a first differentiated LBT scheme being configured for a first purpose corresponding to a first service and a second differentiated LBT scheme being configured for a second purpose corresponding to a second service; and
   transmitting in the unlicensed spectrum using the differentiated LBT schemes.

16. The method according to claim 15, wherein the purpose of the PRACH transmission is a random access, RA, event that triggers the PRACH transmission.

17. The method according to claim 16, wherein the configuration information at least indicates a priority level for each of multiple predetermined RA events.

18. The method according to claim 15, wherein the purpose of the PRACH transmission is a service or data traffic that triggers the PRACH transmission.

19. A terminal device comprising:
   at least one processor; and
   at least one memory, the at least one memory containing instructions executable by the at least one processor, whereby the terminal device is operative to:
   determine to perform physical random access channel, PRACH, or physical uplink control channel, PUCCH, transmission in unlicensed spectrum;
   determine one or more listen before talk, LBT, parameters for the PRACH or PUCCH transmission according to a purpose of the PRACH or PUCCH transmission;
   configure differentiated LBT schemes and differentiated parameters for scheduling request (SR) transmissions based on the purpose, and based on at least one QoS requirement corresponding to the purpose, at least a first differentiated LBT scheme being configured for a first purpose corresponding to a first service and a second differentiated LBT scheme being configured for a second purpose corresponding to a second service; and
   transmit in the unlicensed spectrum using the differentiated LBT schemes.

20. A base station comprising:
   at least one processor; and
   at least one memory, the at least one memory containing instructions executable by the at least one processor, whereby the base station is operative to:
   generate configuration information about listen before talk, LBT, parameters which are to be used for physical random access channel, PRACH, or physical uplink control channel, PUCCH, transmission in unlicensed spectrum;
   send the configuration information to a terminal device;
   the configuration information being generated based on a purpose of the PRACH or PUCCH transmission, and differentiated LBT schemes and differentiated parameters for scheduling request (SR) transmissions being configured based on the purpose, and based on at least one QoS requirement corresponding to the purpose, at least a first differentiated LBT scheme being configured for a first purpose corresponding to a first service and a second differentiated LBT scheme being configured for a second purpose corresponding to a second service; and
   transmit in the unlicensed spectrum using the differentiated LBT schemes.

* * * * *